United States Patent
Lou et al.

(10) Patent No.: US 11,473,859 B2
(45) Date of Patent: Oct. 18, 2022

(54) METHOD OF SEATING A VALVE SEAL

(71) Applicant: Schaeffler Technologies AG & Co. KG, Herzogenaurach (DE)

(72) Inventors: Zheng Lou, Plymouth, MI (US); Biplob Dutta, Flint, MI (US); Vineeth Jampala, Troy, MI (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1018 days.

(21) Appl. No.: 16/180,371

(22) Filed: Nov. 5, 2018

(65) Prior Publication Data
US 2020/0141671 A1  May 7, 2020

(51) Int. Cl.
| | |
|---|---|
| *F01L 7/16* | (2006.01) |
| *F16K 5/04* | (2006.01) |
| *F16K 5/06* | (2006.01) |
| *F28F 27/00* | (2006.01) |
| *F01P 5/10* | (2006.01) |
| *F16K 5/20* | (2006.01) |
| *F16K 5/18* | (2006.01) |
| *F01P 7/14* | (2006.01) |

(52) U.S. Cl.
CPC ............... *F28F 27/00* (2013.01); *F01L 7/16* (2013.01); *F01P 5/10* (2013.01); *F16K 5/188* (2013.01); *F16K 5/205* (2013.01); *F01P 2007/146* (2013.01); *F28F 2250/08* (2013.01); *F28F 2265/16* (2013.01)

(58) Field of Classification Search
CPC .... F28F 27/00; F28F 2250/08; F28F 2265/16; F01P 5/10; F01L 7/16; F01L 7/18; F16K 5/04; F16K 5/0457; F16K 5/0471; F16K 5/06; F16K 5/0663; F16K 5/188; F16K 5/205; F16K 3/22; F16K 3/24; F16K 3/243
See application file for complete search history.

(56) References Cited

U.S. PATENT DOCUMENTS

| | | | |
|---|---|---|---|
| 2004/0140445 A1* | 7/2004 | Pervaiz | F16K 11/0856 251/174 |
| 2010/0090146 A1* | 4/2010 | Keeper | F16K 5/188 251/315.1 |

(Continued)

FOREIGN PATENT DOCUMENTS

EP  3260679 A1  12/2017

*Primary Examiner* — Jacob M Amick
(74) *Attorney, Agent, or Firm* — Volpe Koenig

(57) ABSTRACT

A method of sealing a coolant control valve of a cooling system for a power device which generates heat as a by-product of operation. The cooling system includes a pump, a heat exchanger, and coolant. The valve includes: an internal channel in fluid communication with the exchanger; a sealing package in contact a surface of the coolant control valve and bounding a portion of the cooling system and the channel; and a rotary element in the channel and rotatable to open and close the valve. The portion is bounded in part by the valve and the sealing package. The method includes: starting-up the device; creating a pressure differential of at least 0.2 bar between the coolant in the portion of the cooling system, and the coolant in the internal channel; rotating, using a motor, the rotary element; opening the valve; and pumping, using the pump, the coolant through the internal channel.

20 Claims, 10 Drawing Sheets

(56) References Cited

U.S. PATENT DOCUMENTS

2012/0205569 A1* 8/2012 Yeary .................... F16K 5/0678
  251/192
2018/0149073 A1* 5/2018 Shen ....................... F01P 7/165

\* cited by examiner

METHOD OF SEATING A VALVE SEAL

TECHNICAL FIELD

The present disclosure relates to a method of seating a seal for a coolant control valve in a cooling system for a power device which generates heat as a by-product of operation.

BACKGROUND

During warm-up of a power device which generates heat as a by-product of operation, such as an internal combustion engine, it is desirable to regulate flow of coolant to the power device through a coolant control valve in a cooling system for the engine, in particular for a valve controlling flow to a radiator. For example, excessive leakage or any appreciable coolant flow to the radiator during engine warm-up causes major function issues and results in fuel economy and emission penalties during the engine warm up. The coolant control valve can be closed during warm-up; however, leakage of coolant across a sealing package and into the coolant control valve results in a flow of coolant through the coolant control valve.

SUMMARY

According to aspects illustrated herein, there is provided a method of sealing a coolant control valve of a cooling system for a power device which generates heat as a by-product of operation. The cooling system includes a pump and a heat exchanger. The coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve. The sealing package forms a boundary between the portion of the cooling system and the internal channel. The method includes: starting-up the power device; creating, using the pump, a pressure differential of at least 0.2 bar between coolant in the portion of the cooling system, and coolant in the internal channel; rotating, using a motor, the rotary element; opening the coolant control valve; and pumping, using the pump, coolant through the internal channel.

According to aspects illustrated herein, there is provided a method of sealing a coolant control valve of a cooling system for a power device which generates heat as a by-product of operation. The cooling system includes a pump and a heat exchanger. The coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve. The sealing package forms a boundary between the portion of the cooling system and the internal channel. The method includes: starting-up the power device; pressurizing, using the pump, coolant in the portion of the cooling system to a first pressure, the coolant in the portion of the cooling system in contact with the sealing package; pressurizing, using the pump, the coolant in the portion of the cooling system to a second pressure, the second pressure greater than the first pressure; creating, using the pump, a pressure differential of at least 0.2 bar, or at least 0.5 bar, or at least 1.0 bar, or at least 2.0 bars, between the coolant in the portion of the cooling system and coolant in the internal channel; pressurizing, using the pump, the coolant in the portion of the cooling system to a third pressure, the third pressure less than the second pressure; rotating, using a motor, the rotary element; opening the coolant control valve; and pumping, using the pump, coolant through the internal channel.

According to aspects illustrated herein, there is provided a method of sealing a coolant control valve of a cooling system for a power device which generates heat as a by-product of operation. The cooling system includes a pump and a heat exchanger. The coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve. The sealing package forms a boundary between the portion of the cooling system and the internal channel. The method includes: starting-up the power device; pressurizing, using the pump, coolant in the portion of the cooling system to a first pressure, the coolant in the portion of the cooling system in contact with the sealing package; pumping, using the pump, a flow of the coolant in the portion of the cooling system between the sealing package and the rotary element and into the internal channel; pressurizing, using the pump, the coolant in the portion of the cooling system to a second pressure, the second pressure greater than the first pressure; and reducing the flow with the sealing package.

BRIEF DESCRIPTION OF THE DRAWINGS

Various embodiments are disclosed, by way of example only, with reference to the accompanying schematic drawings in which corresponding reference symbols indicate corresponding parts in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
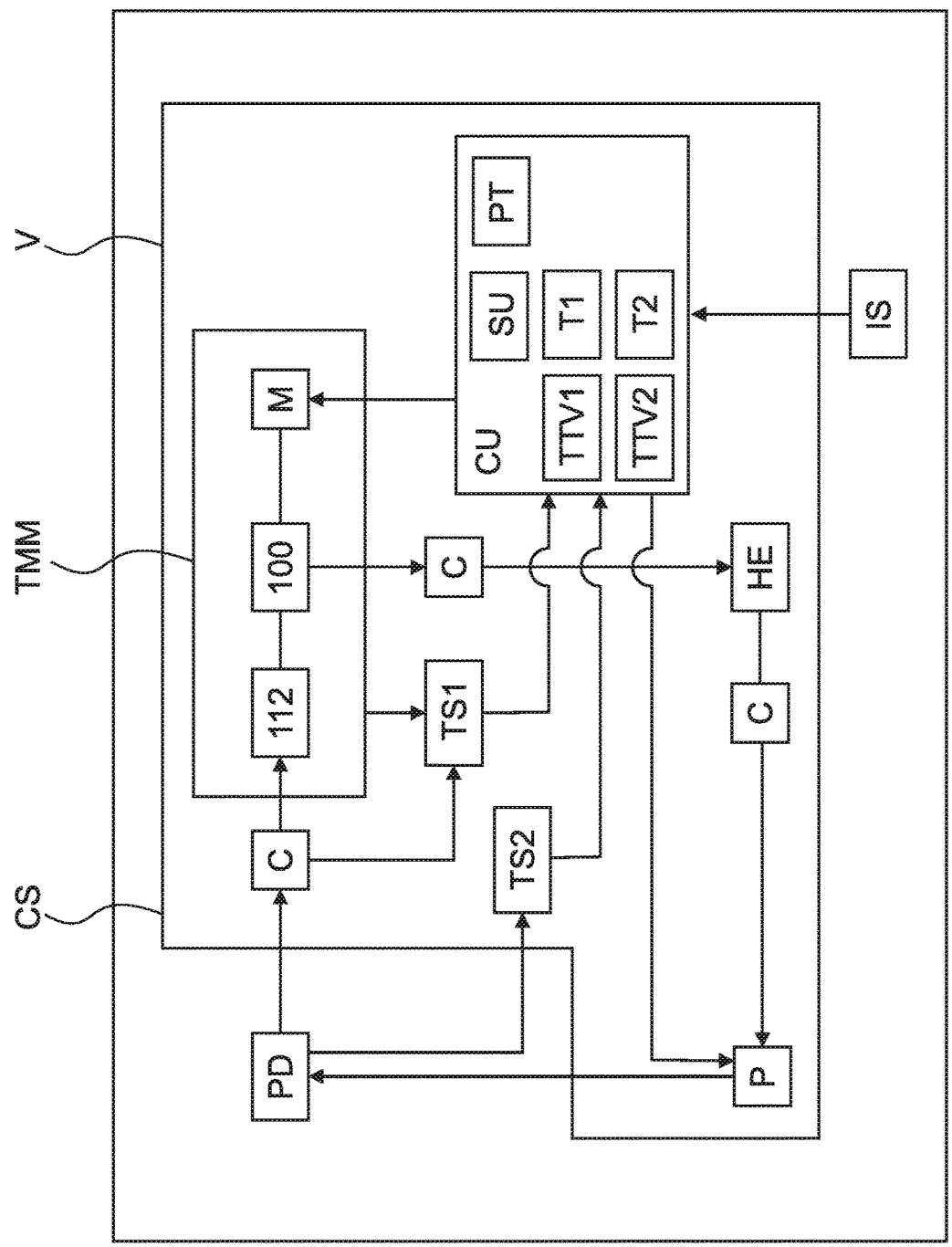
FIG. 1 is a block diagram of an example cooling system for a power device which generates heat as a by-product of operation.

FIG. 1 is a block diagram of example cooling system CS for power device PD which generates heat as a by-product of operation. System CS includes coolant C, pump P, heat exchanger HE, and thermal management module TMM. Module TMM includes coolant control valve 100 and motor M.

Figure 2:
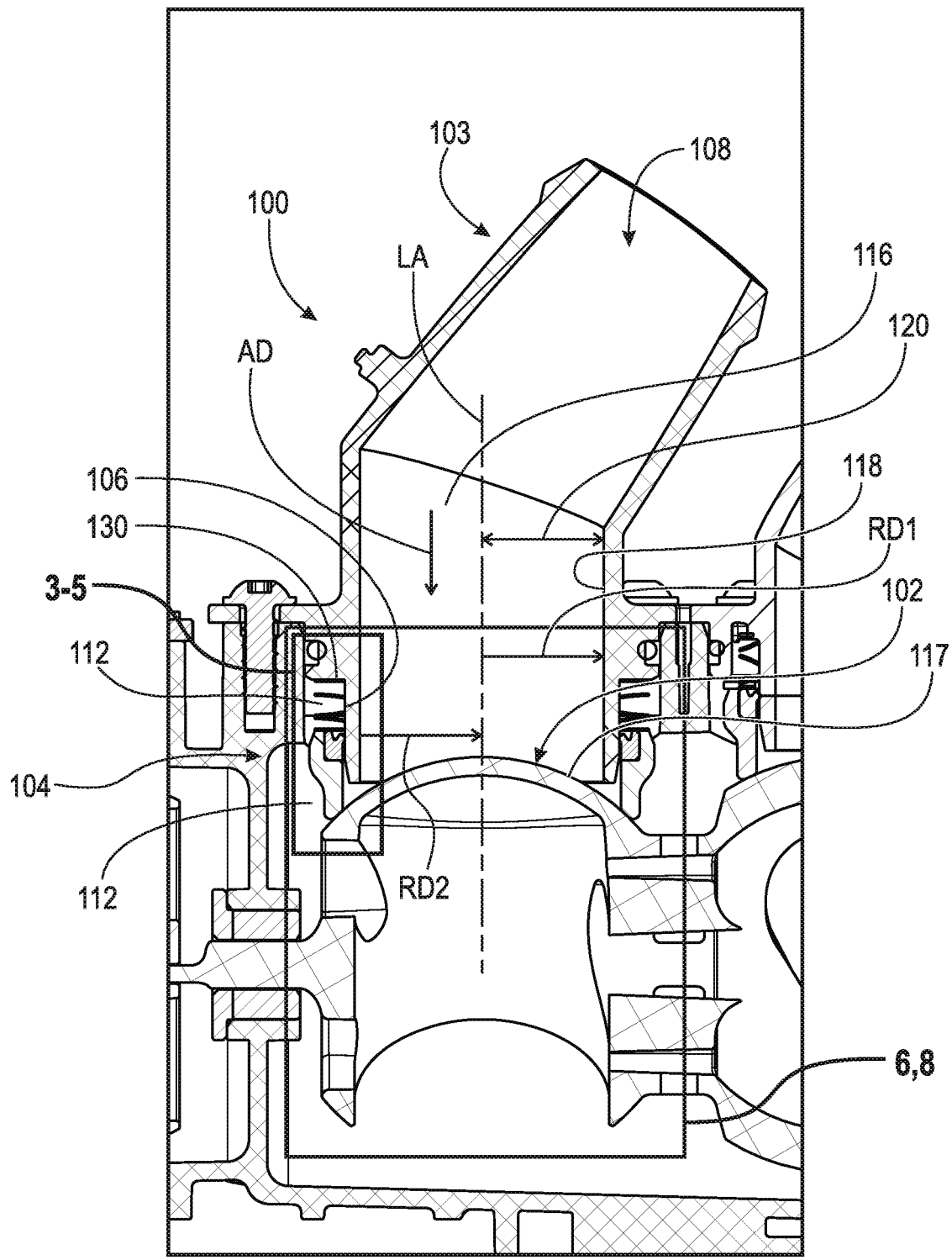
FIG. 2 is cross-sectional view of a portion of a prior art thermal management module in FIG. 1.

FIG. 2 is cross-sectional view of a portion of prior art thermal management module TMM in FIG. 1.

Figure 3:
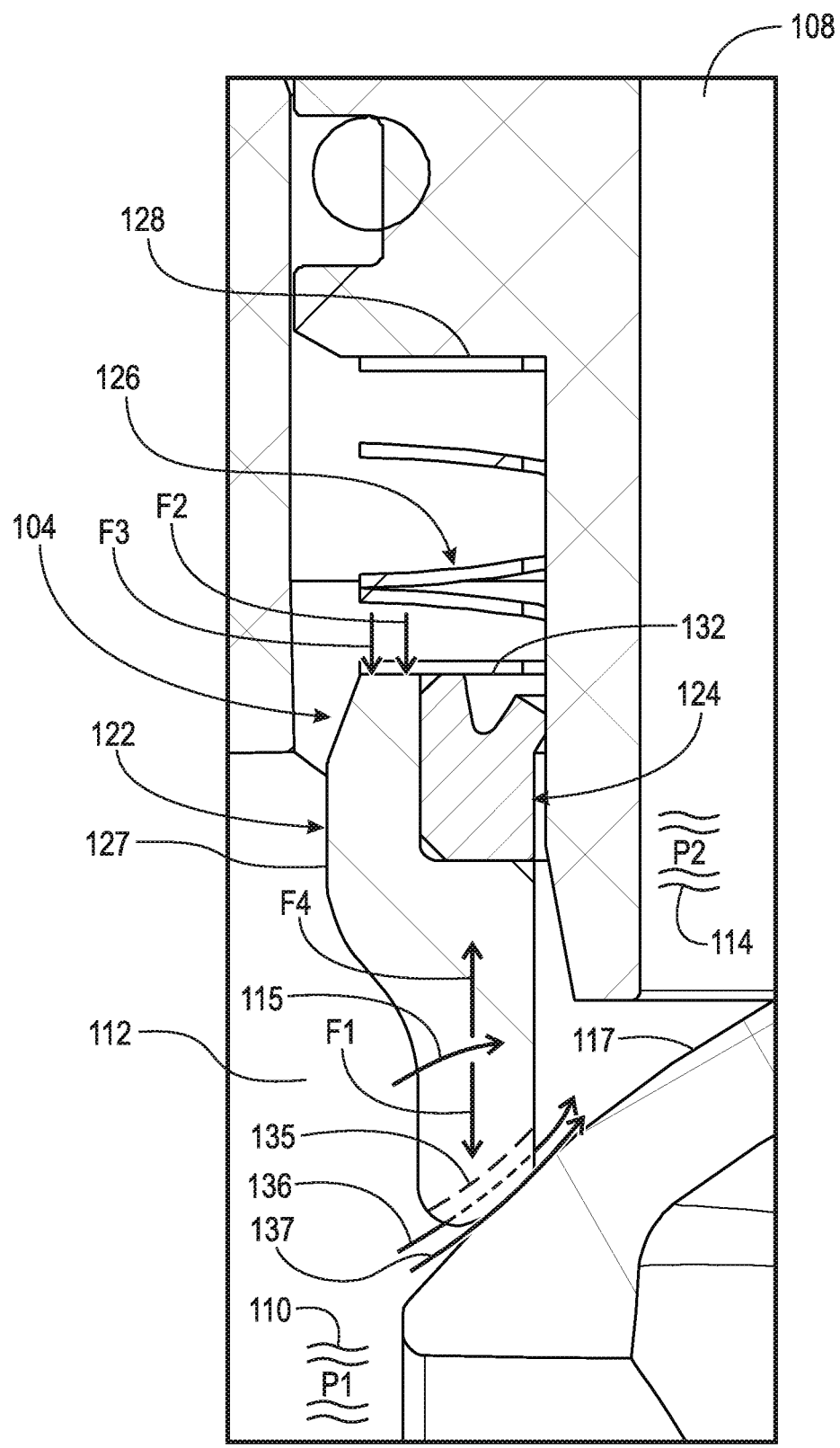
FIG. 3 is a detail of area 3-5 in FIG. 2 in a first prior art pressure differential state.

FIG. 3 is a detail of area 3-5 in FIG. 2 in a first prior pressure differential state. The following should be viewed in light of FIGS. 1 through 3. Coolant control valve 100 includes rotary element 102, fitting 103, sealing package 104 disposed about and in contact with at least one surface 106 of valve 100. In an example embodiment, surface 106 is an exterior surface, for example an exterior surface of fitting 103. Valve 100 includes internal channel 108, for example formed in part by fitting 103, in fluid communication with heat exchanger HE and pump P. Coolant C is disposed in portion 112 of cooling system CS and is in contact with sealing package 104. To simplify the presentation, coolant C in portion 112 is referred to as portion 110. In the example of FIG. 2, portion 112 is a chamber in module TMM. Coolant C is disposed in internal channel 108. To simplify the presentation, coolant C in channel 108 is referred to as portion 114. Sealing package 104 forms a boundary between portion 112 and internal channel 108.

Portions 110 and 114 are at pressures P1 and P2, respectively, resulting pressure differential 115, substantially equal to P1-P2, across sealing package 104 and between coolant portions 110 and 114, tends to slide package 104 along surface 106 in direction AD or compresses package 104 in direction AD. In an internal combustion engine system, pressure differential 115 generally increases with operating speed of coolant pump P and decreases with the opening of valve 100. As valve 100 opens up, there is less flow restriction between coolant portions 110 and 114, which decreases pressure differential 115.

In an example embodiment: device PD is an internal combustion engine for vehicle V; heat exchanger HE is a radiator; coolant control valve 100 is a ball valve; and element 102 includes at least one substantially spherical or cylindrical surface 117.

In an example embodiment: portion 116 of channel 108 is bounded by cylindrical inner surface 118 of coolant control valve 100; longitudinal axis LA passes through internal portion 116; cylindrical surface 118 is at uniform distance 120, in radial direction RD1, from longitudinal axis LA; and radial direction RD1 is orthogonal to longitudinal axis LA and away from axis LA.

In an example embodiment, sealing package 104 includes: primary seal 122; secondary seal 124; and resilient element 126. Seals 122 and 124 are connected. Seal 124 is in contact with exterior surface 106. End 128 of resilient element 126 is directly engaged with shoulder 130 of valve 100, and end 132 of resilient element 126 is directly engaged with seal 122 and/or 124. Element 126 urges seals 122 and 124 in axial direction AD, parallel to axis LA, with respect to exterior surface 106. Resilient element 126 can be any resilient element known in the art, for example, a wave spring.

Methods of operating valve 100 are described below. The following provides information regarding valve 100 and the methods of operating valve 100. As noted above, during warm-up of a power device which generates heat as a by-product of operation, such as device PD: leakage can occur across a seal, for example sealing package 104, intended to seal an internal channel of a coolant control valve, for example seal internal channel 108 of coolant control valve 100 from portion 112. The methods described below reduce leakage across the seal.

In the example of FIG. 3, at least a portion of primary seal 122 is in contact with surface 117 of element 102. However: one or more gaps 135 (exaggerated in FIG. 3) between seal 122 and surface 117 result in flow 136 of coolant C through gaps 135 and into channel 108; or seal 122 is not compressed against surface 117 with sufficient seating force F1 to minimize flow 137 of coolant C from portion 112, between seal 122 and surface 117, and into channel 108.

Element 126 urges seal 122 in direction AD with force F2. Portion 110 of coolant C surrounds a substantial part of exterior surface 127 of seal 122, resulting in force F3, which generally urges seal 122 in direction AD, since more exterior surface area of seal 122 is exposed to portion 110 than to portion 114 (by design,) and pressure P1 is higher than pressure P2 in general. Frictional force F4, due to contact between seal 124 and surface 106, resists displacement of seal 122 in direction AD. Seating force F1 is calculated as: force F1=force F2+force F3−force F4. In the case of FIG. 3, the combination of forces F2 and F3 is insufficient to urge seal 122 against surface 117 to prevent or limit flows 136 and 137.

Figure 4:
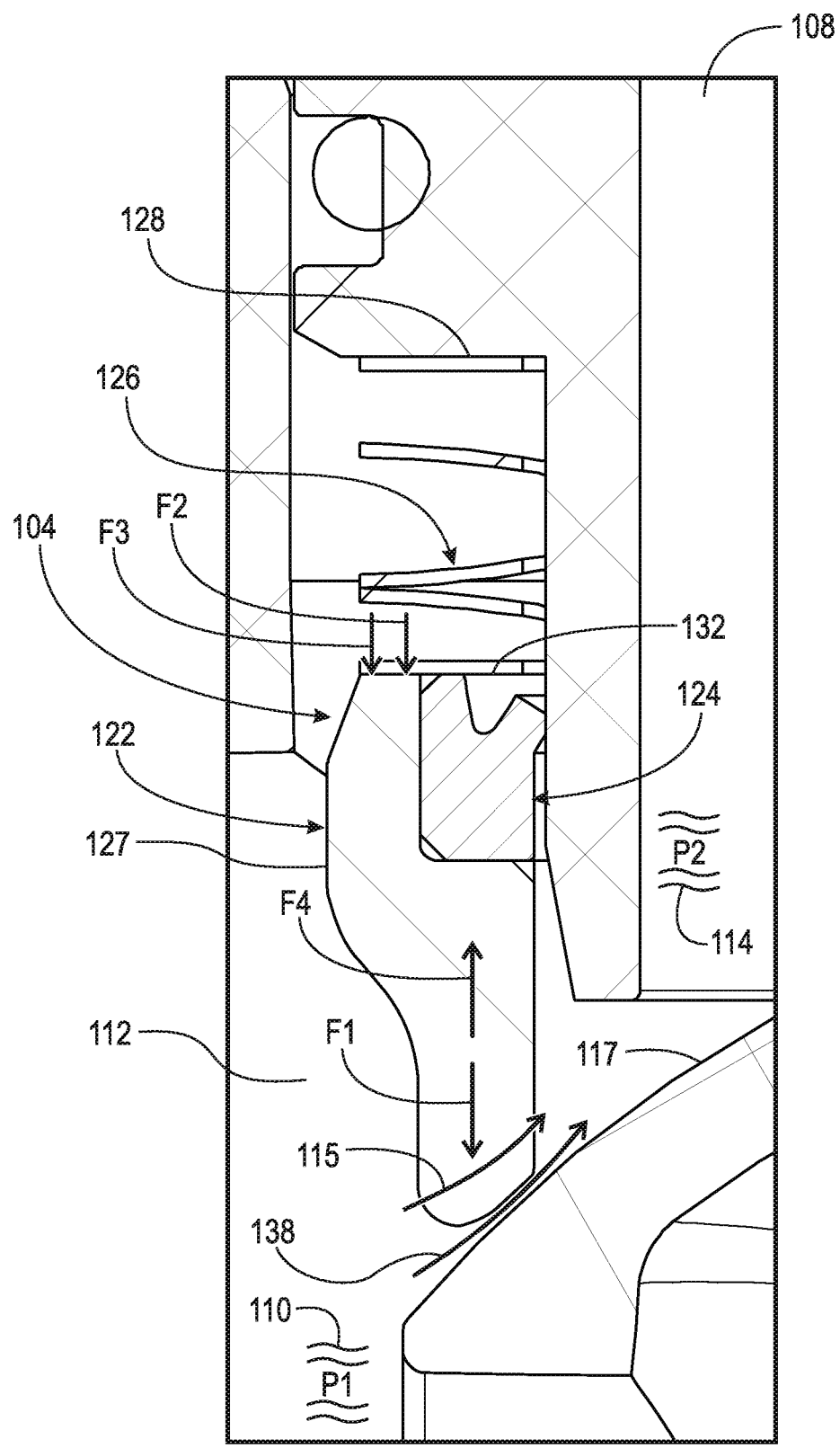
FIG. 4 is a detail of area 3-5 in FIG. 2 in a second prior art pressure differential state.

FIG. 4 is a detail of area 3-5 in FIG. 2 in a second prior art pressure differential state. The following should be viewed in light of FIGS. 1 through 4. In the example of FIG. 4: primary seal 122 is not in contact with surface 117 of element 102 due to insufficient seating force F1; and flow 138 of coolant C from portion 112, between seal 122 and surface 117, and into channel 108 occurs. In FIGS. 3 and 4, rotary element 102 is intended to be in a closed position. That is, channel 108 is to be blocked by element 102, preventing flow of coolant C through channel 108. However, the prevention of coolant C flow through channel 108 is compromised by an insufficient seating force F1 due to an insufficient pressure differential 115 and thus an insufficient pressure force F3. That is, flows 136, 137, and 138 are not adequately reduced by seal 122.

Figure 5:
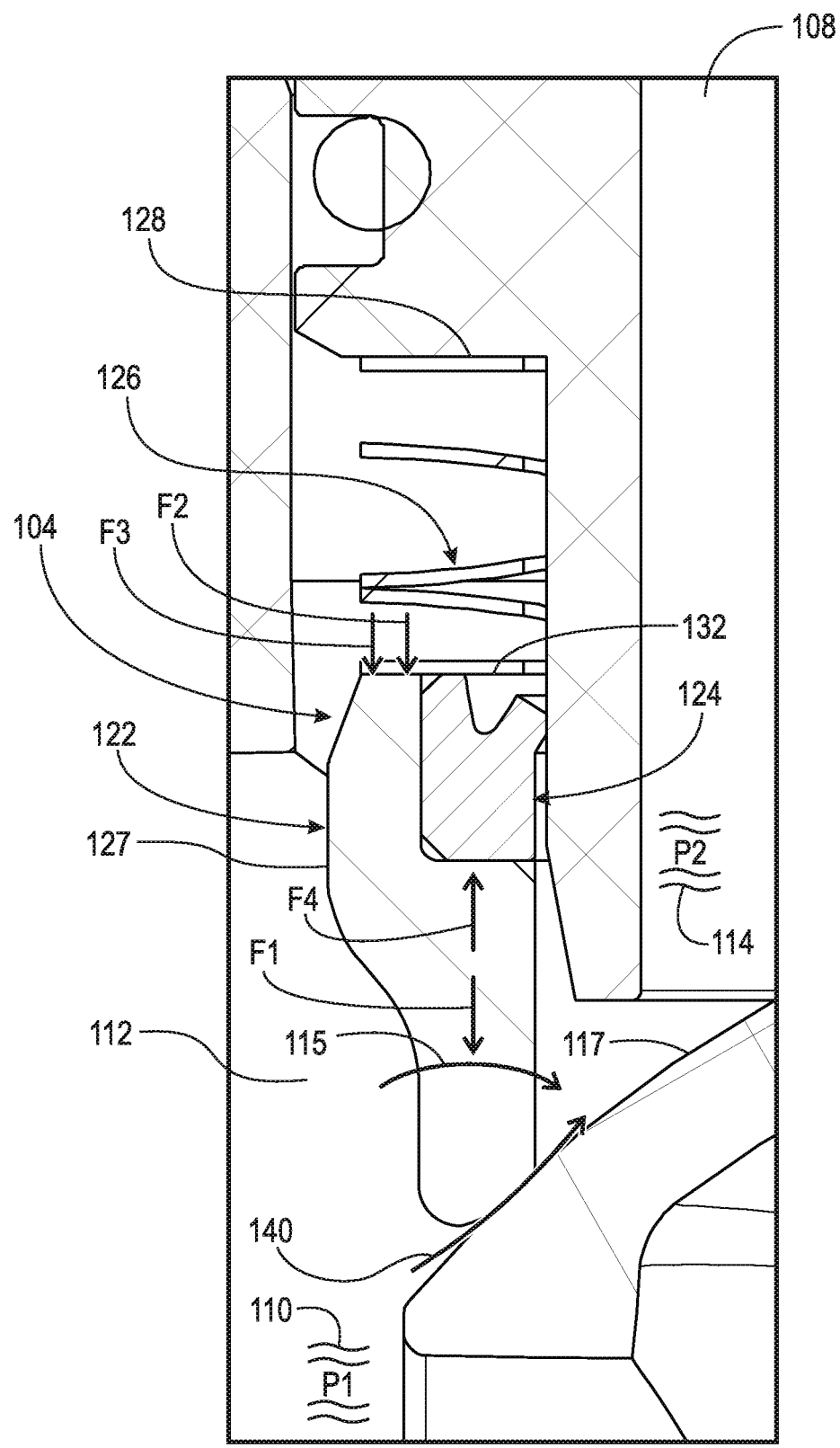
FIG. 5 is a detail of area 3-5 in FIG. 2 in a novel pressure differential state.

FIG. 5 is a detail of area 3-5 in FIG. 2 in a novel pressure differential state. The following should be viewed in light of FIGS. 1 through 5. As noted above, in FIGS. 3 and 4, force F1 is not large enough to reduce flows 136, 137 and 138. Force F2 is substantially constant for a particularly sized resilient element 126. The size of resilient element 126 is limited by the fixed amount of space available for element 126. Therefore, to increase force F1 without the ability to increase F2, force F3 is increased as further described below. For example, to transition from FIGS. 3 and 4 to FIG. 5, pressure differential 115, in particular pressure P1, is more than otherwise required by an increased speed of pump P after start-up of device PD, resulting in a higher pressure force F3 and seating force F1.

A higher force F1: slides or pushes package 104 along surface 106 in direction AD; and/or compresses package 104 in direction AD. As seen in FIG. 5, the sliding and/or compressing of package 104: improves sealing between primary seal 122 and surface 117, resulting in reduced flow 140 of coolant C from portion 112, between seal 122 and surface 117, and into channel 108. Flow 140 is a nominal flow or leakage due to unavoidable imperfections in seal 122 or surface 117, and has a considerably smaller rate that flow 136, flow 137, or flow 138.

Figure 6:
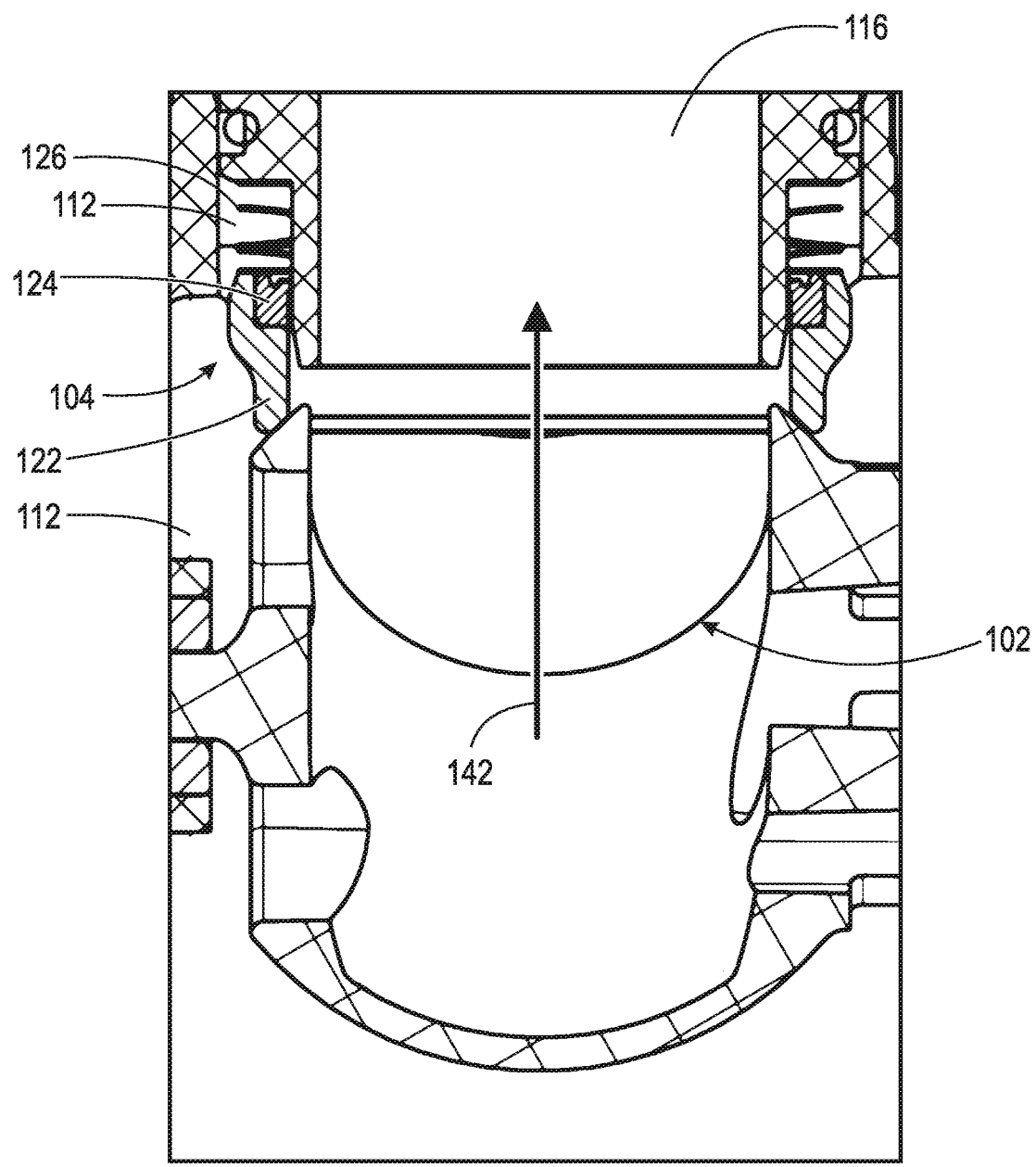
FIG. 6 is a detail of area 6,8 in FIG. 2 with a coolant valve open.

FIG. 6 is a detail of area 6,8 in FIG. 2 with coolant valve 100 open. In FIG. 6, coolant control valve 100 operates in a known cooling mode, for example, rotating element 102 to open valve 100. To cool device PD, pump P pumps flow 142 of coolant C through valve 100, heat exchanger HE, and device PD. In a known cooling mode, pressure differential 115 is created to satisfy the intended functions of system CS. For example, pressure differential 115 resulting from a particular speed of pump P and flow 142, or range of flows 142, optimum for a desired heat transfer in device PD and/or heat exchanger HE. For example, pressure differential 115 resulting from a particular speed of pump P and flow 142, or range of flow 142, optimum for the purpose of power consumption reduction. For example, to reduce electrical power consumption of pump P in light of the limit of battery power available, especially for start-up at low temperature, or simply for fuel economy benefits.

Figure 7:
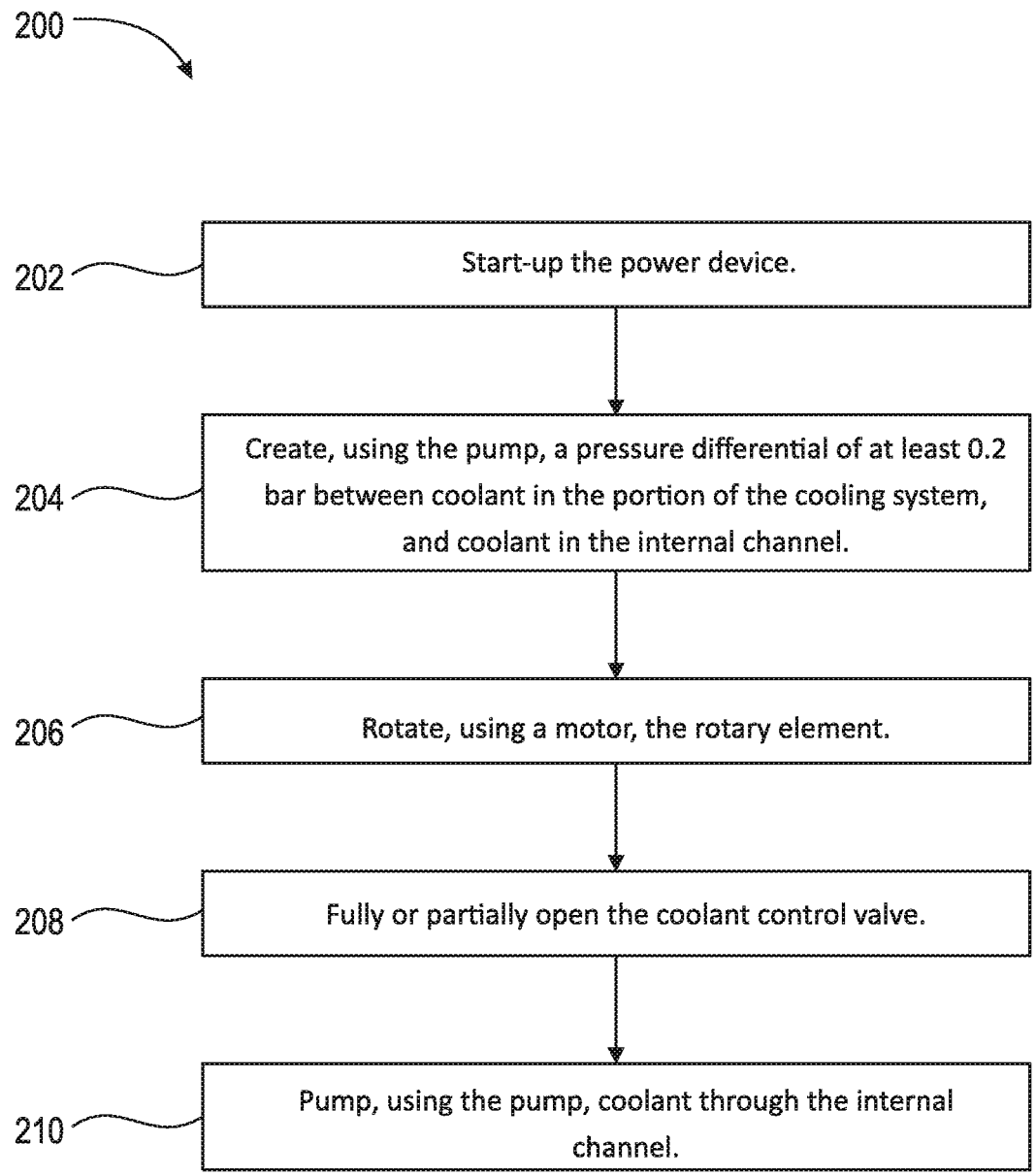
FIG. 7 is a flow chart of a method of sealing a coolant control valve of a cooling system for a power device which generates heat as a by-product of operation.

FIG. 7 shows flow chart 200 for a method of sealing a coolant control valve of a cooling system for a power device which generates heat as a by-product of operation. The cooling system includes a pump and a heat exchanger. The coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve. The sealing package forms a boundary between the portion of the cooling system and the internal channel. Step 202 starts-up the power device. Step 204 creates, using the pump, a pressure differential of at least 0.2 bar between coolant in the portion of the cooling system, and coolant in the internal channel. Step 206 rotates, using a motor, the rotary element. Step 208 fully or partially opens the coolant control valve. Step 210 pumps, using the pump, coolant through the internal channel.

In an example embodiment: step 204 includes pressurizing, using the pump, the coolant in the portion of the cooling system to a first pressure; and after step 204 and prior to step 206, a step pressurizes using the pump, the coolant in the portion of the cooling system to a second pressure, the second pressure less than the first pressure. In an example embodiment, prior to pressurizing, using the pump, the coolant in the portion of the cooling system to the first pressure, a step pressurizes, using the pump, the coolant in the portion of the cooling system to a third pressure, the third pressure less than the first pressure.

In an example embodiment, after pressurizing, using the pump, the coolant in the portion of the cooling system to the third pressure and prior to pressurizing, using the pump, the coolant in the portion of the cooling system to the first pressure, a step: pumps, using the pump, a flow of the coolant in the portion of the cooling system between the sealing package and the rotary element, and into the internal channel; and after pressurizing, using the pump, the coolant in the portion of the cooling system to the first pressure and prior to step 206, reduces, with the sealing package, the flow of the coolant in the portion of the cooling system into the internal channel.

In an example embodiment, step 204 includes: creating a pressure differential of at least 0.5 bar between the coolant in the portion of the cooling system and the coolant in the internal channel; or creating a pressure differential of at least 1.0 bar between the coolant in the portion of the cooling system and the coolant in the internal channel; or creating a pressure differential of at least 2.0 bars between the coolant in the portion of the cooling system and the coolant in the internal channel.

In an example embodiment, step 204 includes increasing a force compressing the sealing package against the rotary element. In an example embodiment, the at least one surface of the coolant control valve is an exterior surface of the coolant control valve and step 204 includes sliding, with the coolant in the internal channel, the sealing package: along the exterior surface of the coolant control valve, or along a surface of the rotary element. In an example embodiment, the at least one surface of the coolant control valve is an exterior surface of the coolant control valve and step 204 includes sliding, with the coolant in the portion of the cooling system, the sealing package: along the exterior surface of the coolant control valve and along a surface of the rotary element.

In an example embodiment: at least a portion of the internal channel is bounded by a cylindrical surface of the coolant control valve, a longitudinal axis passes through the portion of the internal channel, the cylindrical surface is at a uniform distance, in a first radial direction, from the longitudinal axis, and the first radial direction is orthogonal to the longitudinal axis and away from the longitudinal axis; and step 204 includes displacing, with the coolant in the portion of the cooling system, the sealing package in an axial direction parallel to the longitudinal axis. In an example embodiment: the coolant control valve is a ball valve, the rotary element includes a spherical or cylindrical surface, and the sealing package includes a primary seal a secondary seal in contact with the at least one surface of the coolant control valve, and a resilient element in contact with the primary seal or the secondary seal; and a step urges, with the resilient element, the primary seal in an axial direction.

In an example embodiment: prior to step 204, a step measures a temperature of coolant in the cooling system; and step 204 is executed only when the measured temperature of the coolant in the cooling system is less than a threshold temperature value. In an example embodiment: prior to step 204, a step measures an ambient temperature of the power device; and step 204 is executed only when the measured ambient temperature of the power device is less than a threshold temperature value. In an example embodiment, prior to step 204, a step rotates, using the motor, the rotary element to close the coolant control valve.

Figure 8:
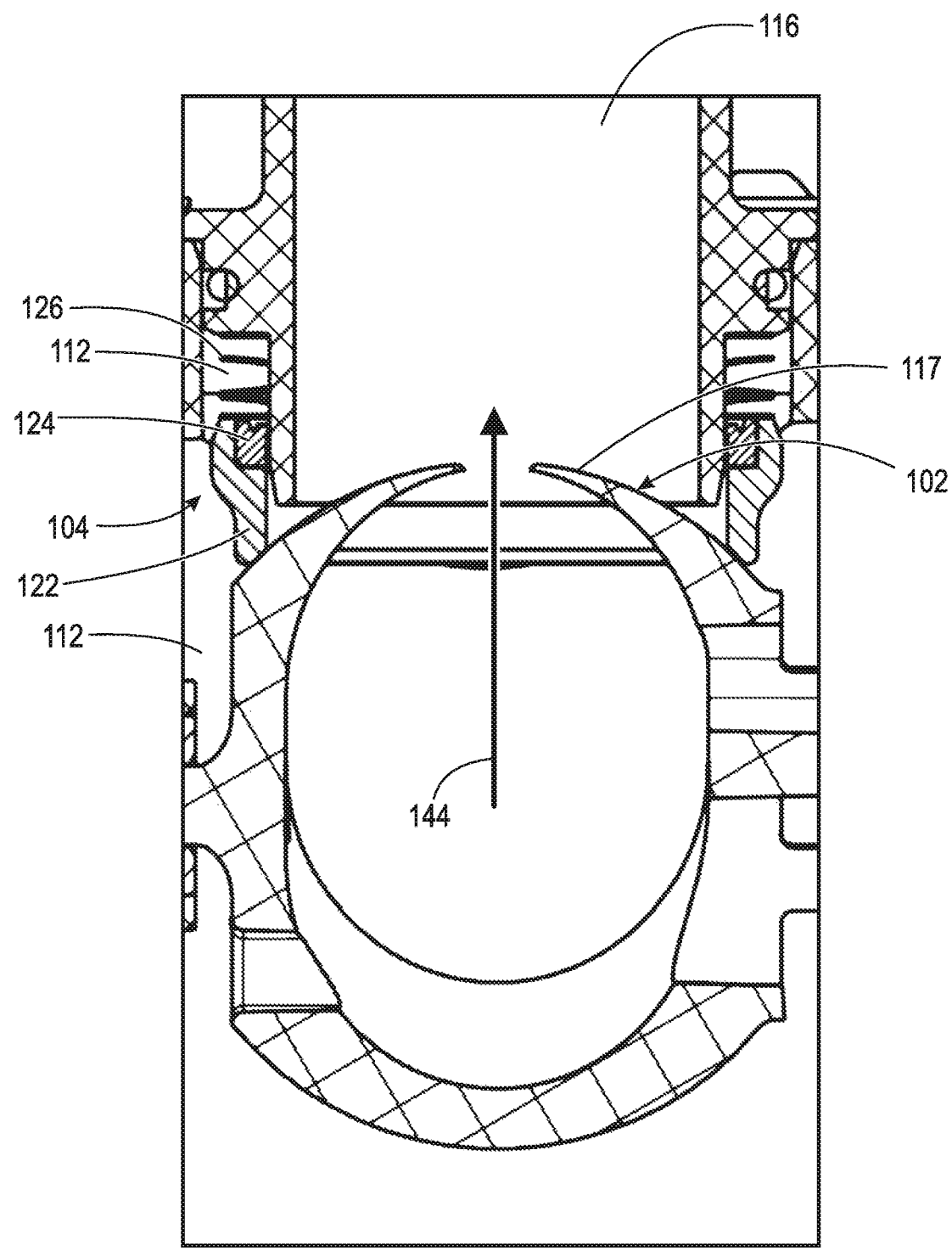
FIG. 8 is a detail of area 6,8 in FIG. 2 with the coolant valve partially open.

FIG. 8 is a detail of area 6,8 in FIG. 2 with coolant valve 100 partially open. In FIG. 8, device PD has not been activated or has just been activated, step 204 has not been implemented, and the rotary element is stuck in a partially open position, for example as shown in FIG. 8, enabling flow 144 of coolant C through channel 108. Beginning with the configuration in FIG. 8, after step 204 and prior to step 206, a step: rotates, using the motor, the rotary element; and closes the coolant control valve. In an example embodiment, valve 100 is stuck in the position shown in FIG. 8 due to friction between seal 122 and surface 117, and step 206 dislodges seal 122 to enable valve 100 to close.

Figure 9:
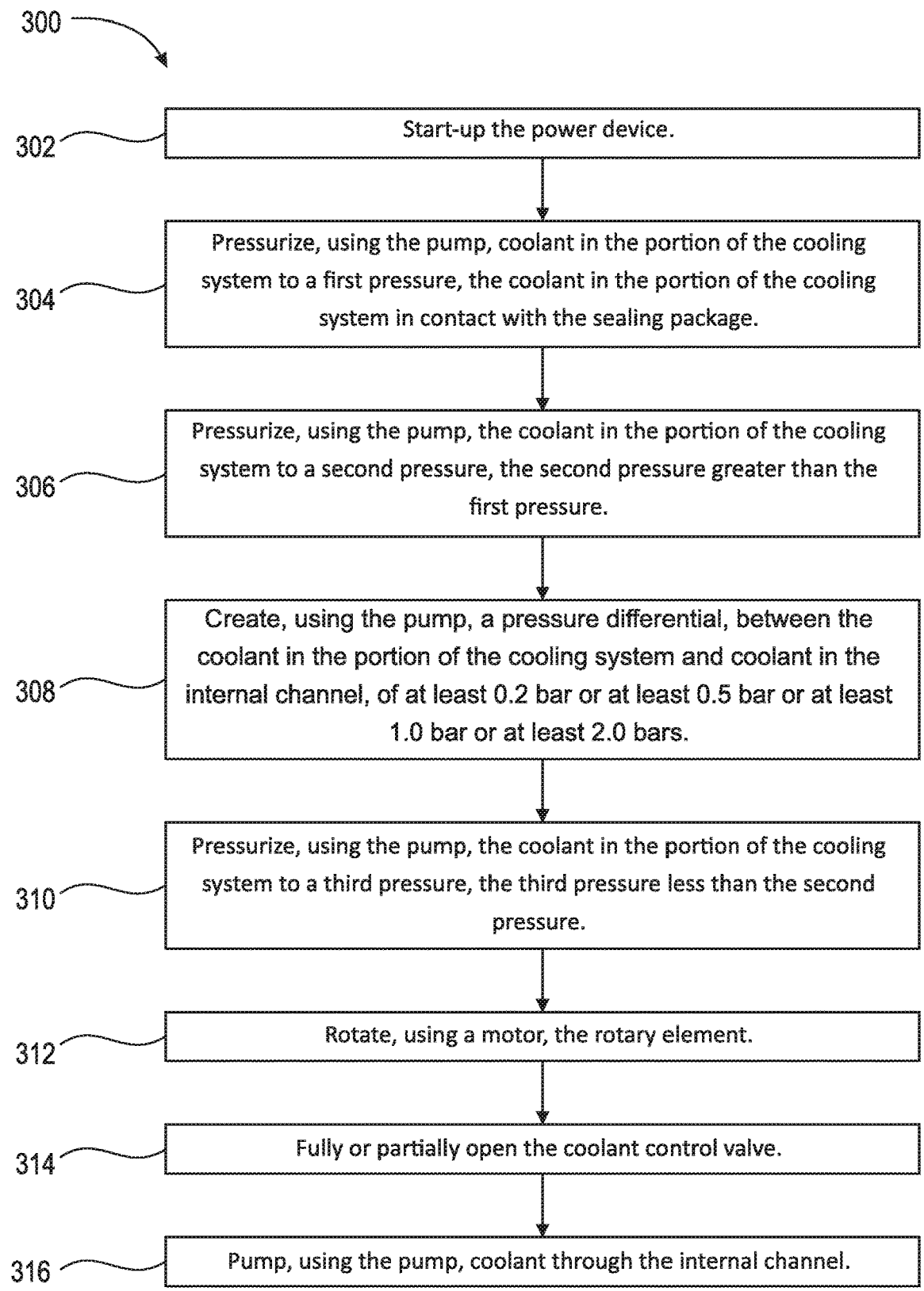
FIG. 9 is a flow chart of a method of sealing a coolant control valve of a cooling system for a power device which generates heat as a by-product of operation; and, FIG. 10 is a flow chart of a method of sealing a coolant control valve of a cooling system for a power device which generates heat as a by-product of operation.

FIG. 9 shows flow chart 300 for a method of sealing a coolant control valve of a cooling system for a power device which generates heat as a by-product of operation. The cooling system includes a pump and a heat exchanger. The coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve. The sealing package forms a boundary between the portion of the cooling system and the internal channel. Step 302 starts-up the power device. Step 304 pressurizes, using the pump, coolant in the portion of the cooling system to a first pressure, the coolant in the portion of the cooling system in contact with the sealing package. Step 306 pressurizes, using the pump, the coolant in the portion of the cooling system to a second pressure, the second pressure greater than the first pressure. Step 308 creates, using the pump, a pressure differential, between the coolant in the portion of the cooling system and coolant in the internal channel, of at least 0.2 bar, or at least 0.5 bar, or at least 1.0 bar or at least 2.0 bars. Step 310 pressurizes, using the pump, the coolant in the portion of the cooling system to a third pressure, the third pressure less than the second pressure. Step 312 rotates, using a motor, the rotary element. Step 314 fully or partially opens the coolant control valve. Step 316 pumps, using the pump, coolant through the internal channel.

In an example embodiment: prior to step 306, a step measures a temperature of coolant in the cooling system; and executes step 306 only when the measured temperature of the coolant in the cooling system is less than a threshold temperature value. In an example embodiment: prior to step 306, a step measures an ambient temperature of device PD; and executes step 306 only when the measured ambient temperature is less than a threshold temperature value. In an example embodiment, after step 308 and prior to step 312, a step: rotates, using the motor, the rotary element; and closes the coolant control valve.

Figure 10:
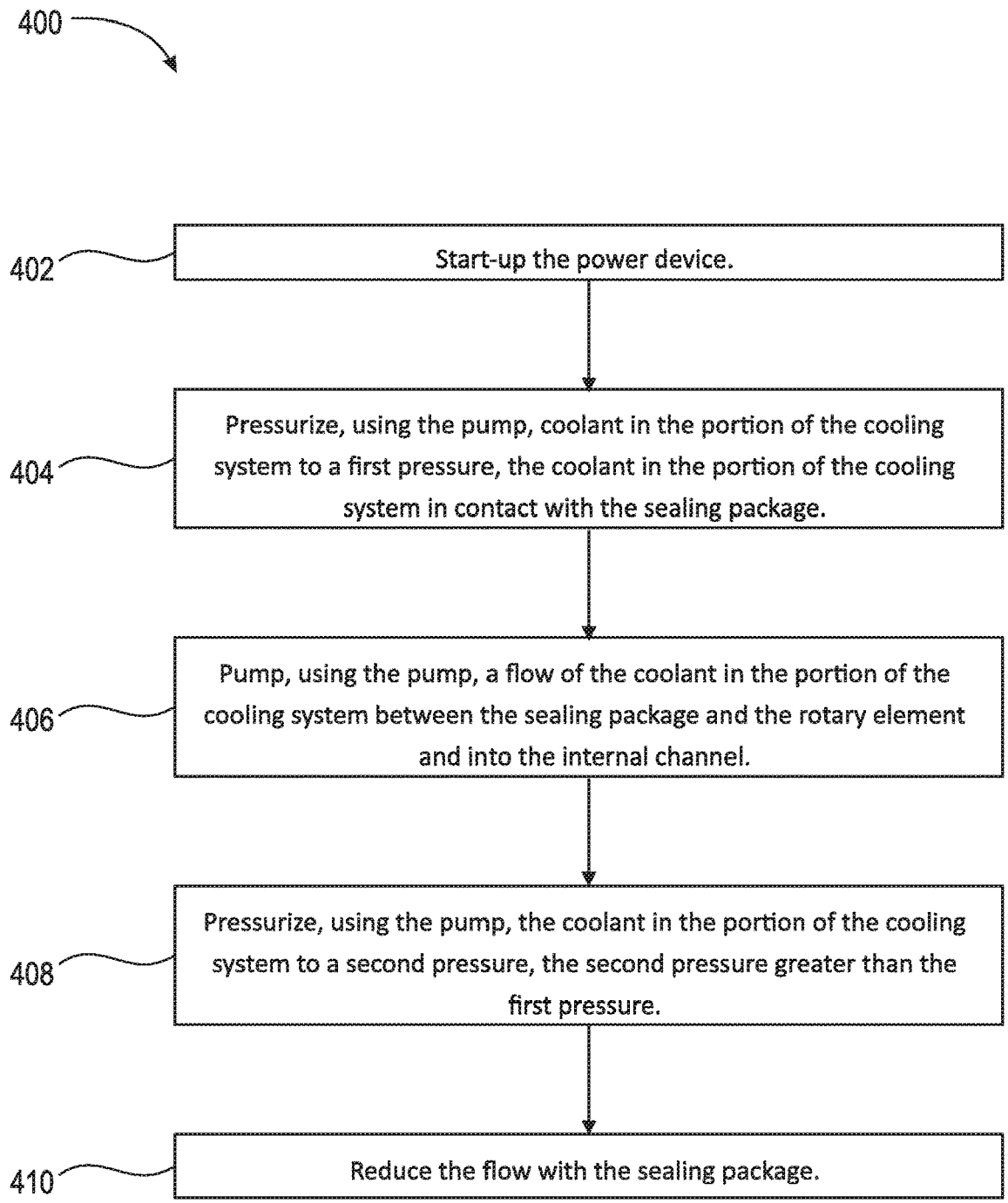

FIG. 10 shows flow chart 400 for a method of sealing a coolant control valve of a cooling system for a power device which generates heat as a by-product of operation. The cooling system includes a pump and a heat exchanger. The coolant control valve includes an internal channel in fluid communication with the heat exchanger and the pump a sealing package located in a portion of the cooling system and in contact with at least one surface of the coolant control valve and a rotary element located in the internal channel and rotatable to open and close the coolant control valve. The sealing package forms a boundary between the portion of the cooling system and the internal channel. Step 402 starts-up of the power device. Step 404 pressurizes, using the pump, coolant in the portion of the cooling system to a first pressure, the coolant in the portion of the cooling system in contact with the sealing package. Step 406 pumps, using the pump, a flow of the coolant in the portion of the cooling system between the sealing package and the rotary element and into the internal channel. Step 408 pressurizes, using the pump, the coolant in the portion of the cooling system to a second pressure, the second pressure greater than the first pressure. Step 410 reduces the flow with the sealing package.

In an example embodiment: prior to step 408, a step measures a temperature of coolant in the cooling system; step 408 is executed only when the measured temperature of the coolant in the cooling system is less than a threshold temperature value. In an example embodiment: prior to step 408, a step measures an ambient temperature of device PD; and executes step 408 only when the measured ambient temperature is less than a threshold temperature value. In an example embodiment, step 408 includes sliding, with the coolant in the portion of the cooling system, the sealing package along the at least one surface of the coolant control valve.

As noted above, after start-up of a power device which generates heat as a by-product of operation, such as device PD, connected to a cooling system such as system CS, it is desirable, for example depending on conditions such as ambient temperature or a temperature of coolant in the cooling system, to block or reduce flow through a coolant control valve, such as valve 100, to a heat exchanger, such as heat exchanger HE. For example, for vehicle V including device PD in the form of an internal combustion engine and heat exchanger HE in the form of a radiator, a large flow or even appreciable leakage of coolant through the coolant control valve to the radiator causes major function issues, radiator thermal fatigue, and fuel economy and emission penalties during warm up of the engine. Methods 200, 300, and 400 reduce the flow of coolant through the control valve during engine warm-up.

In the example of FIG. 1: cooling system CS includes control unit CU, used to control operation of module TMM including valve 100; and vehicle V includes ignition system IS. For example, unit CU: stores values TTVI and TTV2; and monitors sensors TS1 and TS2. As noted above, in example embodiments: prior to steps 204, 306, and 408, a step measures temperature T1 of the coolant; and steps 204, 306, and 408 are executed only when measured temperature T1 is less than threshold temperature value TTV1. Control unit CU compares measured temperature T1 with stored value TTV1 to decide whether to execute steps 204, 306, and 408. Sensor TS1 can measure coolant C outside of module TMM or can measure coolant C inside module TMM, for example in portion 112 or channel 108. In an example embodiment: ignition system IS sends start-up signal SU to control unit CU when the engine is started up; and upon receiving signal SU, control unit CU acquires temperature T1 for comparison to value TTV1.

As noted above, in example embodiments: prior to steps 204, 306, and 408, a step measures ambient temperature T2 of device PD; and steps 204, 306, and 408 are executed only when measured ambient temperature T2 is less than threshold temperature value TTV2. Control unit CU compares measured temperature T2 with stored value TTV2 to decide whether to execute steps 204, 306, and 408. In an example embodiment: ignition system IS sends start-up signal SU to control unit CU when the engine is started up; and upon receiving signal SU, control unit acquires temperature T2 for comparison to value TTV2.

In example embodiments, steps 204, 306, and 408, are executed by control unit CU for predetermined time span PT, stored in unit CU. In an example embodiment, time span PT is adjusted according to temperature T1 or temperature T2. In an example embodiment, time span PT is between one and ten seconds. Stated otherwise, pressure differential 115 is maintained for time span PT.

As noted above, during warm-up of a power device which generates heat as a by-product of operation, such as device PD in the form an internal combustion engine, it is desirable to reduce flow of coolant through a coolant control valve, such as valve 100, to a heat exchanger such as heat exchanger HE in the form of a radiator. For example, as shown in FIGS. 3 and 4, flows 136, 137, and 138 can occur in known warm-up, or pressure differential modes for device PD because force F3 from portion 110 of coolant C is not large enough.

Methods 200, 300, and 400: increase force F3 and subsequently force F1, create pressure differential 115, slide, displace, or compress sealing package 104; and reduce leakage of coolant C across sealing package 104 to acceptable levels. Methods 200, 300, and 400 increase force F3 and subsequently force F1, create pressure differential 115, and dislodge sealing package 104 from surface 117 to enable the stuck element 102 in FIG. 8 to be rotated to close valve 100. In general, following steps 204, 308, and 408, cooling system CS operates in a known manner to provide cooling of device PD.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

AD axial direction
C coolant
CS cooling system
CU control unit
IS ignition system
F1 force seating force
F2 force, spring force
F3 force, pressure force
F4 force, friction force
HE heat exchanger
LA longitudinal axis, internal channel
M motor
P pump
PD power device
PT predetermined time span
RD1 radial direction
SU startup signal
T1 temperature, coolant
T2 ambient temperature, device PD
TMM thermal management module
TS1 temperature sensor
TS2 temperature sensor
TTV1 threshold temperature value
TTV2 threshold temperature value
100 coolant control valve
102 rotary element
103 fitting
104 sealing package
106 exterior surface, fitting
108 internal channel, coolant control valve
112 portion, CS
110 portion, coolant C
114 portion, coolant C
115 pressure differential
116 portion, channel 108
117 spherical or cylindrical surface
118 cylindrical inner surface, fitting
120 radial distance
122 primary seal
124 secondary seal
126 resilient element
127 exterior surface, primary seal
128 end, element 126
130 shoulder, valve 100
132 end, element 126
135 gap
136 flow, coolant
137 flow, coolant
138 flow, coolant
140 flow, coolant
142 flow, coolant
144 flow, coolant

The invention claimed is:

1. A method of sealing a coolant control valve of a cooling system for a power device which generates heat as a by-product of operation, wherein:
the cooling system includes a pump and a heat exchanger;
the coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve; and,
the sealing package forms a boundary between the portion of the cooling system and the internal channel, the method comprising:
starting-up the power device;
creating, using the pump, a pressure differential of at least 0.2 bar between coolant in the portion of the cooling system, and coolant in the internal channel;
rotating, using a motor, the rotary element;
fully or partially opening the coolant control valve; and,
pumping, using the pump, coolant through the internal channel.

2. The method of claim 1, wherein starting up the power device includes rotating the rotary element, using the motor, to close the coolant control valve.

3. The method of claim 1, wherein creating, using the pump, the pressure differential of at least 0.2 bar between the coolant in the portion of the cooling system, and the coolant in the internal channel includes pressurizing, using the pump, the coolant in the portion of the cooling system to a first pressure, the method further comprising:
after creating, using the pump, the pressure differential and prior to rotating, using the motor, the rotary element, pressurizing, using the pump, the coolant in the portion of the cooling system to a second pressure, the second pressure less than the first pressure.

4. The method of claim 3, wherein pressurizing, using the pump, the coolant in the portion of the cooling system to the first pressure includes pressurizing, using the pump, the coolant in the portion of the cooling system to the first pressure for a predetermined time span.

5. The method of claim 3, further comprising:
prior to pressurizing, using the pump, the coolant in the portion of the cooling system to the first pressure, pressurizing, using the pump, the coolant in the portion of the cooling system to a third pressure, the third pressure less than the first pressure.

6. The method of claim 5, further comprising:
after pressurizing, using the pump, the coolant in the portion of the cooling system to the third pressure and prior to pressurizing, using the pump, the coolant in the portion of the cooling system to the first pressure, pumping, using the pump, a flow of the coolant in the portion of the cooling system:
between the sealing package and the rotary element; and, into the internal channel; and,
after pressurizing, using the pump, the coolant in the portion of the cooling system to the first pressure and prior to rotating the rotary element and opening the coolant control valve, reducing, with the sealing package, the flow of the coolant in the portion of the cooling system into the internal channel.

7. The method of claim 1, wherein creating, using the pump, the pressure differential of at least 0.2 bar between the coolant in the portion of the cooling system, and the coolant in the internal channel includes:
creating a pressure differential of at least 0.5 bar between the coolant in the portion of the cooling system, and the coolant in the internal channel; or,
creating a pressure differential of at least 1.0 bar between the coolant in the portion of the cooling system, and the coolant in the internal channel; or,
creating a pressure differential of at least 2.0 bars between the coolant in the portion of the cooling system, and the coolant in the internal channel.

8. The method of claim 1, wherein creating, using the pump, the pressure differential of at least 0.2 bar between the coolant in the portion of the cooling system, and the coolant in the internal channel includes increasing a force compressing the sealing package against the rotary element.

9. The method of claim 1, wherein:
the at least one surface of the coolant control valve is an exterior surface of the coolant control valve; and,
creating, using the pump, the pressure differential of at least 0.2 bar between the coolant in the portion of the cooling system, and the coolant in the internal channel includes sliding, with the coolant in the portion of the cooling system, the sealing package along the exterior surface of the coolant control valve.

10. The method of claim 1, wherein:
at least a portion of the internal channel is bounded by a cylindrical surface of the coolant control valve;
a longitudinal axis passes through the portion of the internal channel;
the cylindrical surface is at a uniform distance, in a first radial direction, from the longitudinal axis;
the first radial direction is:
orthogonal to the longitudinal axis; and,
away from the longitudinal axis; and,
creating, using the pump, the pressure differential of at least 0.2 bar between the coolant in the portion of the cooling system, and the coolant in the internal channel includes displacing, with the coolant in the portion of the cooling system, the sealing package in an axial direction parallel to the longitudinal axis.

11. The method of claim 10, wherein:
the coolant control valve is a ball valve;
the rotary element includes a ball; and,
the sealing package includes:
a primary seal;
a secondary seal in contact with the at least one surface of the coolant control valve; and,
a resilient element in contact with the primary seal or the secondary seal, the method further comprising:
urging, with the resilient element, the primary seal in the axial direction.

12. The method of claim 1, further comprising:
prior to creating, using the pump, the pressure differential of at least 0.2 bar between the coolant in the portion of the cooling system, and the coolant in the internal channel:
measuring a temperature of coolant in the cooling system; and,
creating, using the pump, the pressure differential of at least 0.2 bar between the coolant in the portion of the cooling system, and the coolant in the internal channel only when the measured temperature of the coolant in the cooling system is less than a threshold temperature value.

13. The method of claim 1, further comprising:
prior to creating, using the pump, the pressure differential of at least 0.2 bar between the coolant in the portion of the cooling system, and the coolant in the internal channel:
measuring an ambient temperature of the power device; and,
creating, using the pump, the pressure differential of at least 0.2 bar between the coolant in the portion of the cooling system, and the coolant in the internal channel only when the measured ambient temperature is less than a threshold temperature value.

14. The method of claim 1, further comprising:
after creating, using the pump, the pressure differential of at least 0.2 bar between the coolant in the portion of the cooling system, and the coolant in the internal channel and prior to rotating the rotary element and opening the coolant control valve:
rotating, using the motor, the rotary element; and,
closing the coolant control valve.

15. The method of claim 1, further comprising:
prior to creating, using the pump, the pressure differential of at least 0.2 bar between the coolant in the portion of the cooling system, and the coolant in the internal channel, rotating, using the motor, the rotary element to close the coolant control valve.

16. A method of sealing a coolant control valve of a cooling system for a power device which generates heat as a by-product of operation, wherein:
the cooling system includes a pump and a heat exchanger;
the coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve; and,
the sealing package forms a boundary between the portion of the cooling system and the internal channel, the method comprising:
starting-up the power device;
pressurizing, using the pump, coolant in the portion of the cooling system to a first pressure, the coolant in the portion of the cooling system in contact with the sealing package;
pressurizing, using the pump, the coolant in the portion of the cooling system to a second pressure, the second pressure greater than the first pressure;
creating, using the pump, a pressure differential, between the coolant in the portion of the cooling system and coolant in the internal channel, of:
at least 0.2 bar; or,
at least 0.5 bar; or,
at least 1.0 bar; or,
at least 2.0 bars;
pressurizing, using the pump, the coolant in the portion of the cooling system to a third pressure, the third pressure less than the second pressure;
rotating, using a motor, the rotary element;

fully or partially opening the coolant control valve; and,
pumping, using the pump, coolant through the internal channel.

17. The method of claim 16, further comprising:
prior to pressurizing, using the pump, the coolant in the portion of the cooling system to the second pressure:
measuring a temperature of coolant in the cooling system; and,
pressurizing, using the pump, the coolant in the portion of the cooling system to the second pressure only when the measured temperature of the coolant in the cooling system is less than a threshold temperature value.

18. A method of sealing a coolant control valve of a cooling system for a power device which generates heat as a by-product of operation, wherein:
the cooling system includes a pump and a heat exchanger;
the coolant control valve includes an internal channel in fluid communication with the heat exchanger and the pump, a sealing package located in a portion of the cooling system and in contact with at least one surface of the coolant control valve, and a rotary element located in the internal channel and rotatable to open and close the coolant control valve; and,
the sealing package forms a boundary between the portion of the cooling system and the internal channel, the method comprising:
starting-up the power device;
pressurizing, using the pump, coolant in the portion of the cooling system to a first pressure, the coolant in the portion of the cooling system in contact with the sealing package;
pumping, using the pump, a flow of the coolant in the portion of the cooling system:
between the sealing package and the rotary element; and,
into the internal channel;
pressurizing, using the pump, the coolant in the portion of the cooling system to a second pressure, the second pressure greater than the first pressure; and,
reducing the flow with the sealing package.

19. The method of claim 18, further comprising:
prior to pressurizing, using the pump, the coolant in the portion of the cooling system, measuring a temperature of coolant in the cooling system; and,
pressurizing, using the pump, the coolant in the portion of the cooling system only when the measured temperature of the coolant in the cooling system is less than a threshold temperature value.

20. The method of claim 18, further comprising:
creating, using the pump, a pressure differential, between the coolant in the portion of the cooling system and coolant in the internal channel, of:
at least 0.2 bar; or,
at least 0.5 bar; or,
at least 1.0 bar; or,
at least 2.0 bars.

* * * * *